(12) United States Patent  (10) Patent No.: US 6,969,083 B2
Egan  (45) Date of Patent: Nov. 29, 2005

(54) MOTORCYCLE ENGINE GUARD AND FOOT PEG

(75) Inventor: Craig P. Egan, Toronto (CA)

(73) Assignee: Kuryakyn Holdings, Inc., Somerset, WI (US)

( * ) Notice: Subject to any disclaimer, the term of this patent is extended or adjusted under 35 U.S.C. 154(b) by 0 days.

(21) Appl. No.: 10/791,062

(22) Filed: Mar. 2, 2004

(65) Prior Publication Data

US 2005/0116443 A1     Jun. 2, 2005

Related U.S. Application Data

(60) Provisional application No. 60/526,038, filed on Dec. 1, 2003.

(51) Int. Cl.[7] ................................................ B62J 25/00
(52) U.S. Cl. .................. 280/291; 280/304.4; 180/219; 296/75; 74/564
(58) Field of Search ....................... 280/291, 288, 280/304.4, 288.4; 74/564; 296/75; 180/218–219; D12/114

(56) References Cited

U.S. PATENT DOCUMENTS

| 3,384,389 | A | * | 5/1968 | Polley, Jr. .................... 280/291 |
| 3,794,353 | A |   | 2/1974 | Oliver ......................... 280/291 |
| 4,174,852 | A | * | 11/1979 | Panzica et al. ............... 280/291 |
| D270,527 | S |   | 9/1983 | O'Rourke .................... D12/114 |
| D274,803 | S |   | 7/1984 | Hughes ....................... D12/126 |
| D294,686 | S |   | 3/1988 | Ableidinger et al. ........ D12/126 |
| 4,802,684 | A | * | 2/1989 | Bennett et al. ........... 280/304.4 |
| 5,226,341 | A |   | 7/1993 | Shores ....................... 74/551.8 |
| D348,422 | S |   | 7/1994 | Rasmusen .................. D12/114 |
| D350,921 | S |   | 9/1994 | Carroll ...................... D12/114 |
| D361,311 | S |   | 8/1995 | Lindby ....................... D12/126 |
| D365,534 | S | * | 12/1995 | Malone et al. ............. D12/114 |
| 6,161,859 | A | * | 12/2000 | Cheng ........................ 280/291 |
| D483,699 | S | * | 12/2003 | Anthony .................... D12/114 |

OTHER PUBLICATIONS

1994 Harley-Davidson Genuine Parts & Accessories, p. 15, Items G, I, J, K, L; 33, Items G, H; 53, Item E.
1992 Harley-Davidson Genuine Accessories, p. 97, Chrome Engine Guards and Engine Guard Mount Footpegs.
Harley Davidson Motorcycle Accessories Catalog, 1989, p. 39, the chrome engine guard.

(Continued)

Primary Examiner—Matthew Luby
(74) Attorney, Agent, or Firm—Westman, Champlin & Kelly, P.A.

(57) ABSTRACT

An engine guard for a motorcycle is made so that it will mount onto a motorcycle frame and has horizontally extending rail sections on opposite sides of the frame. Foot pegs are mounted at the outer ends of the horizontally extending sections. The foot pegs are positioned on opposite sides of the motorcycle and will pivot about a generally horizontal axis from a deployed position where they extend outwardly from the horizontal rail sections to a stowed position wherein the foot pegs are nested into a recess provided in the top of the respective horizontal rail section. The foot pegs include anti-slip surfaces. The stowed position moves the foot pegs inwardly, and provides a surface for supporting the feet of a rider. When the pegs are extended outwardly, the feet on the pegs are spaced at a greater distance from the center plane of the motorcycle than when the foot pegs are in the stowed position.

16 Claims, 4 Drawing Sheets

OTHER PUBLICATIONS

Drag Specialties Catalog, 1987, p. 422, the Engine Guards w/Footpegs.
Drag Specialties Catalog, 1987, p. 145, the highway bars (A&B).
Kuryakyn Catalog, published 2000, cover and pp. 33 and 37.
Kuryakyn Accessories for GL Catalog, published 2002, cover and p. 37.
Kuryakyn Catalog, published 2001, cover and p. 48.

* cited by examiner

MOTORCYCLE ENGINE GUARD AND FOOT PEG

This application refers to and claims priority on U.S. Provisional Application Ser. No. 60/526,038 filed Dec. 1, 2003, which is hereby incorporated by reference.

BACKGROUND OF THE INVENTION

The present invention relates to an engine guard that attaches to the front frame of a motorcycle and which has laterally extending generally horizontal rails on which a folding foot peg is mounted that will be usable as a foot rest in both an extended or displayed position where the foot rest extends outwardly from the engine guard, and in a folded or stowed position where the foot pegs nest into a provided receptacle on the respective engine guard rails.

Various types of foot pegs for motorcycles have been advanced in the past, as well as various engine guards. One type of engine guard is shown in U.S. Design Pat. No. Des. 348,422, where the engine guard is clamped to the front members of a motorcycle frame, and extend outwardly to provide a foot rest, with enlarged balls fixed at the ends of outwardly extending portions.

A foot rest for a motorcycle frame that has a laterally extending guard portion and folding pedals at the outer ends is shown in U.S. Pat. No. 3,794,353. In this instance, the pedals are pivoted and will fold from a horizontal position to a vertical position. When in the vertical position, the pedals protrude upwardly from the foot rest frame and can cause interference.

Another type of an engine guard and foot rest arrangement is shown in U.S. Design Pat. No. Des. 270,527. The foot rests appear to be permanently fixed in place.

U.S. Design Pat. No. D361,311 also shows an engine guard and foot rest with annular anti-slip rings for placing the rider's feet on horizontal portions of the foot rest.

SUMMARY OF THE INVENTION

The present invention relates to an engine guard for a motorcycle that is fixed to and extends laterally from the front end of the frame of a motorcycle to the opposite sides of the frame. The engine guard has rails or sections that are generally horizontal on which a foot of the rider can rest. At the outer ends of the horizontal sections, foot pegs are pivotally mounted. The foot pegs will pivot from a deployed position extending outwardly from the engine guard to a stowed position where they are folded inwardly and overlie portions of the generally horizontal rail. When folded inwardly, the foot pegs are received in receptacles formed in the rails of the engine guard, so that they nest in place and do not substantially enlarge the outer size of the engine guard rail when they are folded.

The foot pegs of the present invention can be used as foot rests in either the stowed or folded portions or in the unfolded or deployed position. Suitable anti-slip members are provided on the surfaces of the foot pegs that are exposed for supporting a riders feet in either one of the two positions.

DETAILED DESCRIPTION OF THE PREFERRED EMBODIMENTS

Figures 1, 4:
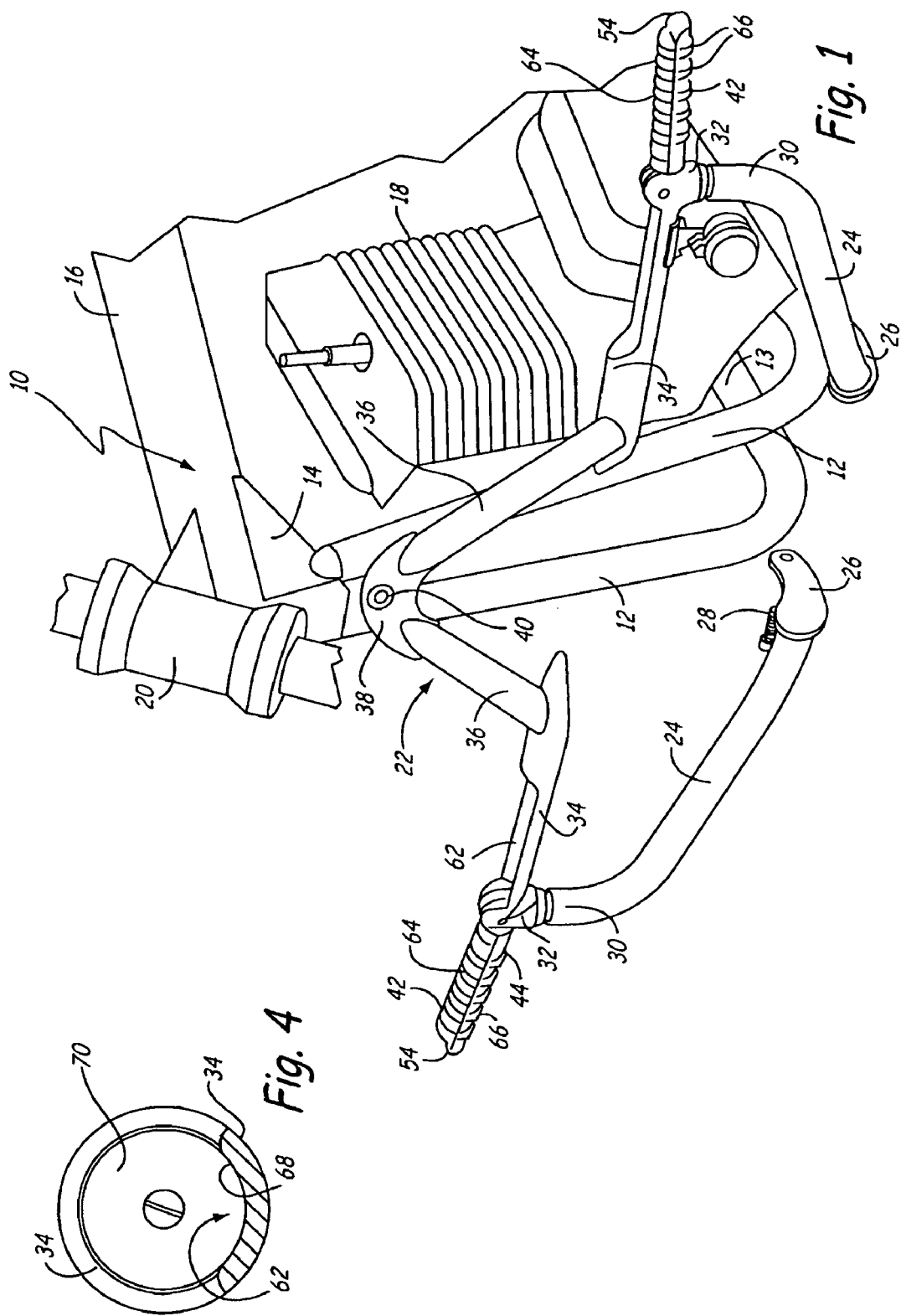
FIG. 1 is a front perspective view of an engine guard made according to the present invention with a schematic representation of a motorcycle frame for illustrative purposes.
FIG. 4 is a sectional view taken on line 4—4 in FIG. 3.

Referring to FIG. 1, a motorcycle frame is shown very fragmentarily for reference purposes at 10, and as it can be seen, it has forward end frame members 12 that extend upwardly from lower frame pipes 13. The forward end frame members 12 taper together toward the top and are held with a bracket 14 relative to a horizontal frame member 16. A motor 18 that is shown only schematically, is mounted on the frame members in the lower portion of the frame, and is used for powering the motorcycle in a normal manner. A fork retainer sleeve 20 is at the front end of the horizontal frame member 14. The motorcycle is assembled in a normal manner.

A combined engine guard and folding foot peg bracket made according to the present invention is illustrated at 22. The engine guard 22 has lower support struts 24, 24 on opposite sides of the frame 10. The lower end of the struts carry brackets 26 that bolt to the frame lower pipes 13 with suitable bolts 28 as shown in FIG. 1. The struts 24 taper upwardly on the opposite sides of the frame, and each strut has an upwardly extending portion 30, on which a pivot and connector support bracket 32 is mounted.

The brackets 32 in turn are each connected to a separate generally horizontal rail section 34. The rail sections 34 are connected to support pipes 36 on each side of the frame. The support pipes 36 taper upwardly toward the junction of the frame members 12. A support plate 38 is secured to the upper ends of the support pipes 36. The plate 38 is used to connect the upper end of the engine guard to the frame 10 with a suitable fastener 40. This fastener arrangement for fastening plate 38 to the frame can be of any desired type, but generally, the top of the engine guard is clamped in place, or the fastener 40 can be threaded into openings on portions of the frame, or held on another type of bracket.

Figure 6:
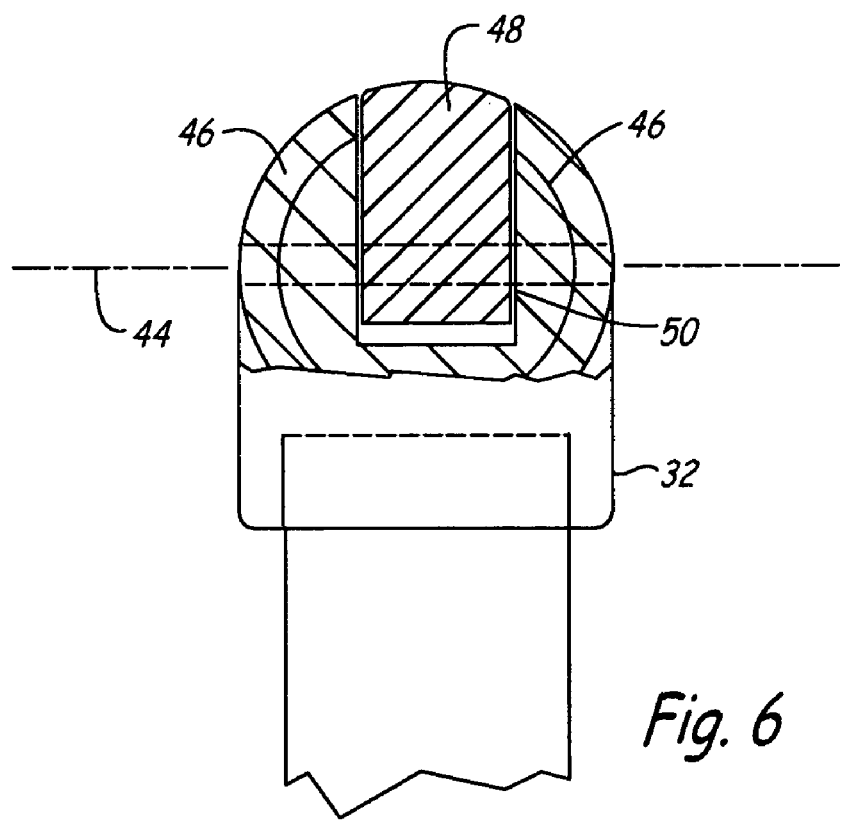
FIG. 6 is a sectional view taken on line 6—6 in FIG. 2.

The present invention includes a pair of pivoting, folding foot pegs 42, one on each side of the motorcycle, and the foot pegs 42, are each pivotally mounted about a pivot axis 44 on the opposite sides of the motorcycle to the respective connector and pivot and peg support bracket 32. The brackets 32 are at the outer ends of the horizontal rails 34 and extend inwardly to form an open top saddle for the foot pegs. The brackets 32 are bifurcated at the outer end to provide a pair of spaced side members 46, 46, as shown in FIG. 6. The foot pegs 42 each have a central core or bolt 52 that has an ear portion 48 that fits between the respective side members 46, and is contoured and of size so that it will pivot about the pivot axis 44. The pivot axis 44 is formed with a suitable pivot bolt 50.

Figure 2:
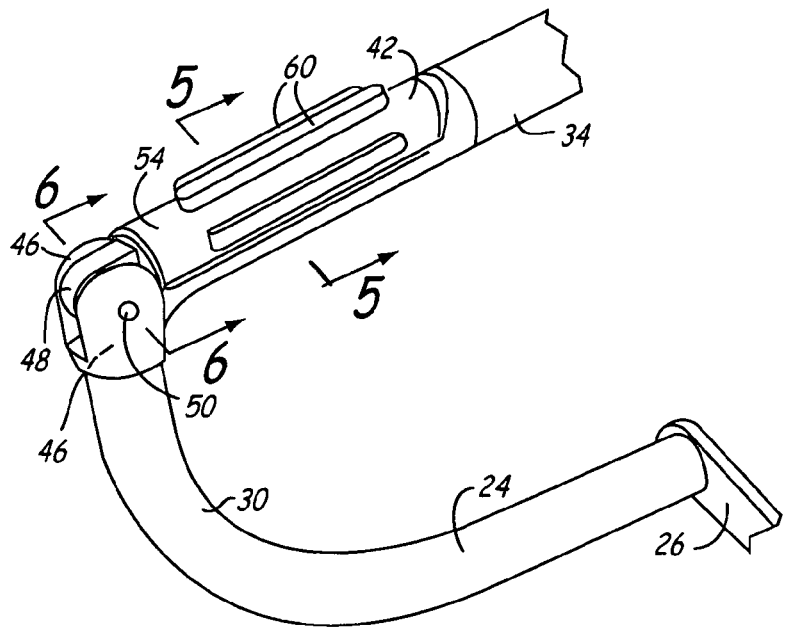
FIG. 2 is a rear perspective view of one side of the engine guard shown in FIG. 1 with the peg in its "stowed" or nested position.
Figure 3:
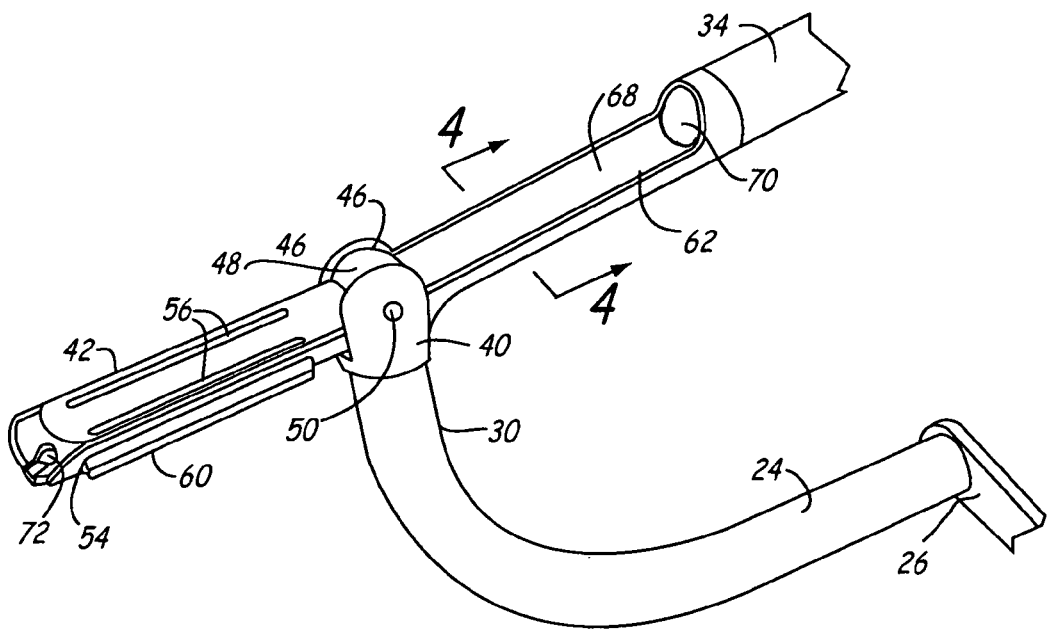
FIG. 3 is a rear perspective view similar to FIG. 2 with the foot peg in its deployed position.

The foot pegs 42 are configured as desired and generally are so that they will pivot from an open or deployed position shown in FIGS. 1 and 3 to a stowed position as shown in FIG. 2.

Figure 5:
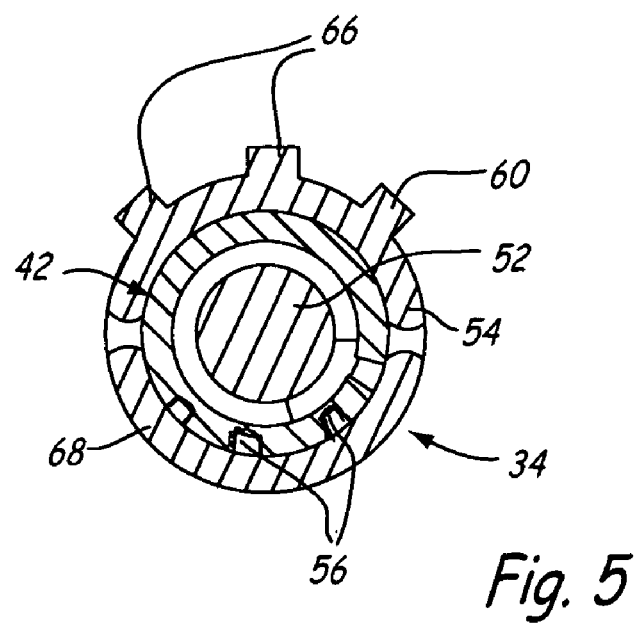
FIG. 5 is a sectional view taken on line 5—5 in FIG. 2.

The pivot ears 48 of the foot pegs 42 are part of a respective cylindrical core or bolt 52 of the foot peg, as shown in FIG. 5. The core has a threaded end and can support first foot peg sections 53 at end walls formed on section 53. The section 53 can be of a suitable material, such as die cast metal. A longitudinally extending cap 54 is also attached to the core or bolt 52. The cap 54 may be made of hard rubber and will be on the upper side of the rail when the foot peg is in its stowed position as shown in FIG. 2. The foot peg assembly can be made in any desired manner, length and style. When the foot peg 42 is in its deployed position, the section 53 has a part cylindrical surface facing upwardly. This part cylindrical surface and the wall having the surface have a plurality of longitudinal anti-slip grooves 56 formed in the surface.

When the foot peg 42 is deployed, as shown in FIGS. 1 and 3, there will be an irregular surface on the foot peg on which the rider's feet can rest.

Each of the caps 54 on the foot pegs has a number of ribs 60 that extend longitudinally along the foot peg to provide for an anti-slip surface when the foot pegs are in the stowed or folded position.

FIG. 1 shows a modified form of the anti-slip or anti-skid surface on the foot peg, comprising part annular grooves 64 on the side that is up when the foot peg is deployed as shown in FIG. 1, and part annular ribs 66 on the cap 54, that would be on the top when the foot peg is pivoted to its stowed position.

It can be see in FIGS. 1, 2, 4 and 5 that each of the brackets 32 at the outer ends of the horizontal rails 34 forms a pocket or a recess 62 that extends from the outer end inwardly for a sufficient length to receive the respective foot peg 42 when the foot peg is stowed. The cap 54 is on the top of the foot peg in the stowed position and is about the same size as the rail 34. The recess 62 in each bracket 32 is formed by a part cylindrical lower wall 68 joining the wall of the rail 34. The inner end of the recess is closed with an end wall 70 that blends in with the respective rail 34 and the wall 70 at the inner ends of brackets 32 can be bolted to fittings to join it to the rail.

It is important to note therefore that the foot peg is usable, and is positioned generally horizontally (or at suitable angles) in both its deployed and stowed positions, and the two positions result in the feet being farther away from the frame in the deployed position. Nonetheless the feet are supportable in the deployed position as well as in the stowed position of the foot pegs.

The tubes or pipes used to make the engine guard can be all chrome plated. The foot pegs themselves can be made in other variations, but include a pivot ear that is pivotally mounted on a suitable pivot axis, and will nest into a receptacle in the horizontal rail section or portion of the engine guard.

The support for the engine guard to the frame also can be of any desired type. Separate side members comprising horizontal rail portions 34 and strut portions 24 can be supported on one side of frame 10 independently of the rail and strut on the other side of the frame.

Figure 7:
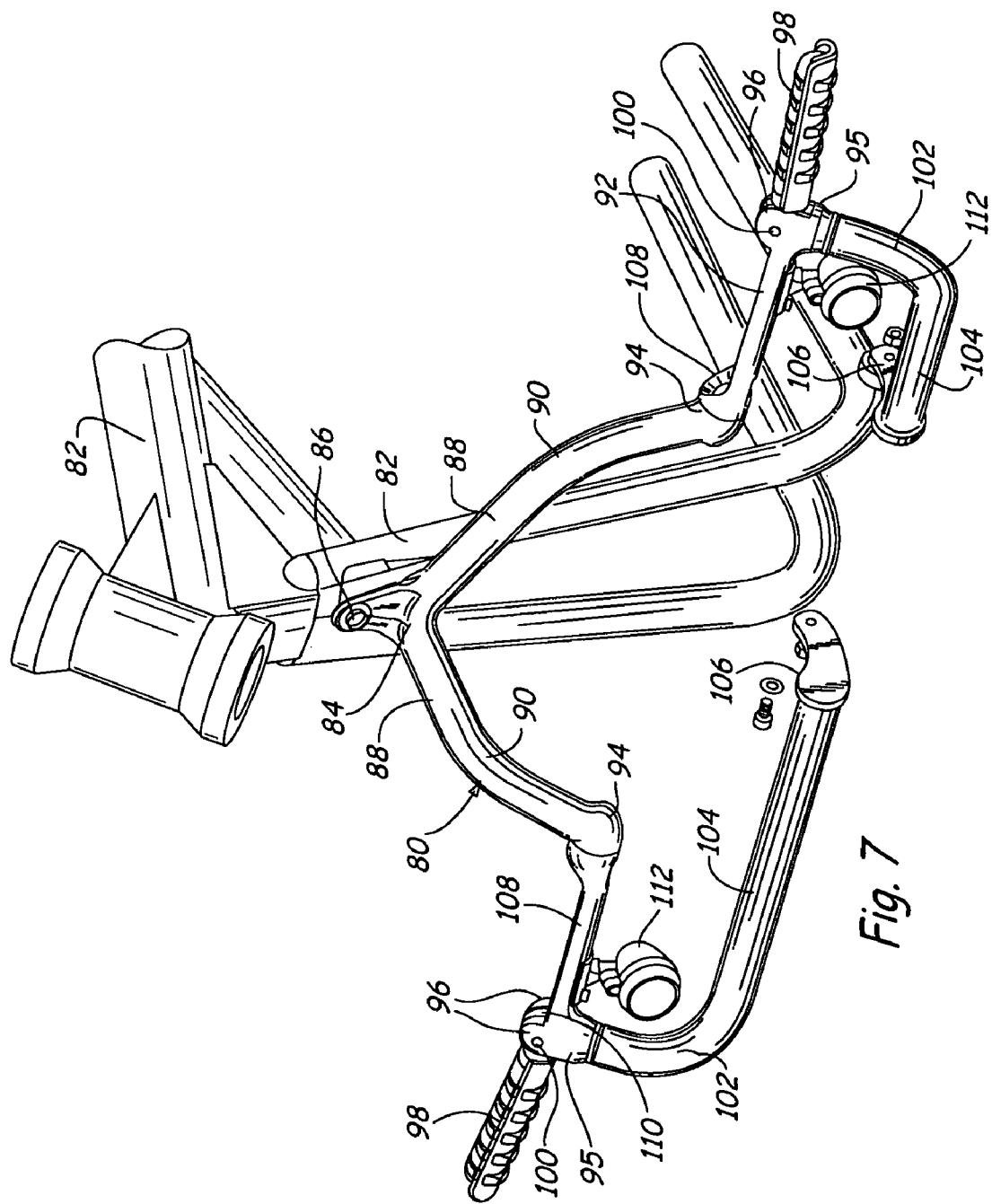
FIG. 7 is a perspective view similar to FIG. 1 showing a modified combined-engine guard and foot peg bracket.

Referring to FIG. 7, a modified engine guard and folding foot peg support or bracket 80 is shown on a schematically illustrated motorcycle frame 82. The engine guard 80 is made of several components, including a central mounting bracket 84 that can be forged or otherwise formed separately.

The bracket 84 has an opening at the top for a fastener 86, to secure it to the frame 82 in a known manner. The bracket 84 has diverging tube sections 88 piloted thereon and welded in place. The tube sections 88 join downwardly extending curved tubes 90.

The curved tubes 90 are joined to horizontal foot peg support rails 92 through elbow brackets 94. The elbow brackets are separately formed, and welded to the tubes. The foot peg support rails 92 have connector brackets 95 at outer ends thereof which have spaced pivot flanges 96 to which foot pegs 98 are pivoted. Foot pegs 98 are pivoted to the flange with pivot pins 100.

The brackets 95 have downwardly extending portions that join lower bent tubes 102 that in turn join inwardly extending tube sections 104. The inner ends of the tube sections 104 are joined to lower members of the motorcycle frame 82, with brackets 106 which are suitably bolted or otherwise fastened in place.

The horizontal rail sections 92 are provided with upwardly open, part cylindrical pockets 108. The foot pegs 98 are shown pivoted outwardly from the rail sections 92 to a stopped position to be used in a wide foot position. The support ears 110 on the foot pegs 98 positioned between the flanges 96 will engage a cross surface at the base of the flanges, which acts as a stop for the foot pegs.

The foot pegs fold into the respective pockets or receptacles 108 for use in a more narrow foot position. The foot pegs remain exposed on the open top of the receptacles for use as foot rests. The foot pegs can thus be used in two positions by quickly moving them between the inner and outer positions about the pivot pin.

The horizontal rails 92 also can be used for supporting lights 112, if desired. Other accessories can be mounted on the engine guard and foot peg support, so long as the accessories do not interfere with foot peg folding and use.

The second form of the invention shows a modified design, with the same functions as folding foot pegs. The engine guard and foot peg supports can be tube sections welded together or formed in fewer parts than those shown, as desired.

Different curves and curvature designs can be utilized. Lights can be supported on the horizontal rail portions if desired, as well.

A very neat appearing engine guard is provided, and the engine guard supports foot pegs that will fold to a completely stowed and substantially unobtrusive position in a recess or receptacle in a horizontal rail portion of the engine guard. The foot pegs will pivot to extend outwardly from the engine guard. The foot pegs will pivot to extend outwardly from the engine guard for supporting the feet of a motorcycle rider. The incorporation of foot pegs into an engine guard places the use in either a wide spacing or a reduced width.

Although the present invention has been described with reference to preferred embodiments, workers skilled in the art will recognize that changes may be made in form and detail without departing from the spirit and scope of the invention.

What is claimed is:

1. A guard for mounting onto a frame of a motorcycle, said guard comprising a generally horizontal rail section having an inner end supportable on the frame, and an outer end spaced from the frame, the outer end of the generally horizontal rail section having a recess in an upper side thereof, a pivot bracket at the outer end of the generally horizontal rail section, and a foot peg pivotally mounted to the pivot bracket about a generally horizontal axis and pivotable to extend outwardly from the pivot bracket and the rail section in a first position, and to be pivoted substantially 180° to a stowed position, the foot peg fitting into the recess in the stowed position and overlying at least a portion of the generally horizontal rail section of the guard.

2. The guard of claim 1, wherein said pivot bracket comprises a pair of side members that are spaced apart to define a space therebetween, the foot peg having an ear at one end that fits in the space between the side members, and a pivot bolt for mounting the ear of the foot peg between the side members about the generally horizontal axis.

3. The guard of claim 1, wherein said foot peg has a surface configuration forming irregularities for reducing slippage tendencies.

4. The guard of claim 3, wherein said irregularities comprise ribs extending generally in a longitudinal direction along the foot peg perpendicular to the pivot axis on at least one side of the foot peg.

5. The guard of claim 1, wherein said foot peg has a plurality of grooves defined in the surface thereof that extend generally perpendicular to the pivot axis, said grooves being on a side of the foot peg that is facing upwardly in its first position.

6. The guard of claim 1, wherein said foot peg comprises a cylindrical core member, a part cylindrical cap on an exterior of the core member and extending over a portion of the periphery less than 180°, said cap having substantially the same configuration and size as an outer surface of the generally horizontal rail section and aligning with the outer surface when the foot peg is in its stowed position.

7. A guard for mounting onto a frame of a motorcycle, said guard comprising a generally horizontal rail section having an inner end supportable on the frame, and an outer end spaced from the frame, a pivot bracket at the outer end of the generally horizontal rail section, and a foot peg pivotally mounted to the pivot bracket about a generally horizontal axis and pivotable to extend outwardly from the pivot bracket and the rail section in a first position, and to be pivoted substantially 180° to a stowed position overlying at least a portion of the rail section of the guard, and a second frame section joined to and extending upwardly from the inner end of the generally horizontal rail section adjacent to the frame and adapted to be securable to the frame.

8. A guard for mounting onto a frame of a motorcycle, said guard comprising a generally horizontal rail section having an inner end supportable on the frame, and an outer end spaced from the frame, a pivot bracket at the outer end of the generally horizontal rail section, a strut having an upwardly extending outer portion that supports the pivot bracket and the outer end of the horizontal rail section and the strut at an inner end supportable on a lower portion of the motorcycle frame, and a foot peg pivotally mounted to the pivot bracket about a generally horizontal axis and pivotable to extend outwardly from the pivot bracket and the rail section in a first position, and to be pivoted substantially 180° to a stowed position overlying at least a portion of the rail section of the guard.

9. An engine guard and foot peg combination for a motorcycle comprising a framework having a pair of strut members attachable to lower portions of a frame of a motorcycle on opposite sides of the frame, said strut members having portions that extend upwardly and outwardly from a center plane of the motorcycle, a pair of horizontal rail portions having rail outer ends joined to outer ends of the strut members and overlying the strut members, said horizontal rail portions extending inwardly from the rail outer ends toward rail inner ends of the horizontal rail portions adjacent the frame of the motorcycle, an upwardly extending support for supporting the rail inner ends of the horizontal rail portions relative to the frame of the motorcycle at an upper portion of the frame, and a pair of foot pegs, one mounted on each of the rail outer ends of the horizontal rail portions, and movable substantially 180° from a deployed position wherein the foot pegs extend outwardly from the rail outer ends of the horizontal rail portions to a stowed position wherein the foot pegs overlie the respective horizontal rail portions and extend inwardly from the pivot axis between the respective foot peg and the respective rail outer ends.

10. The combination of claim 9 wherein the support has a bracket adjacent a center line of the frame, and has side members tapering outwardly and downwardly to join the rail inner ends of the horizontal rail portions.

11. The combination of claim 9, wherein said horizontal rail portions are generally cylindrical in shape, and a recess formed in the upper side of each of the horizontal rail portions adjacent the rail outer ends, such that the foot pegs do not protrude substantially above the surface of the cylindrical shaped horizontal rail portions when in the respective stowed position.

12. The combination of claim 11, wherein said foot pegs have ribs raised above the surface of the horizontal rail portions when the respective foot peg is in the stowed position.

13. The combination of claim 11, wherein the strut members have support brackets at their outer ends, the rail outer ends being connected to the respective support bracket.

14. The combination of claim 13, wherein the support brackets comprise pivot brackets, the foot pegs being pivotally connected to the pivot brackets.

15. The combination of claim 14 wherein the support brackets are separately formed and join the horizontal rail portions to the strut members.

16. The combination of claim 10 wherein the side members and the rail inner ends of the horizontal rail portions are joined with separately formed elbow brackets.

* * * * *